J. M. WILLBUR.
Vault-Covers.
No. 150,119.          Patented April 21, 1874.
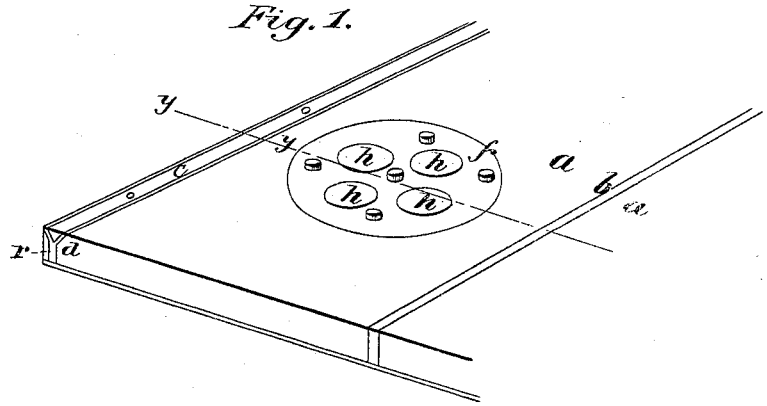
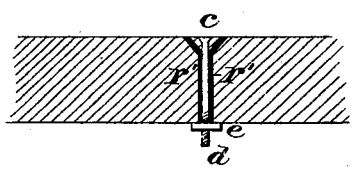
Witnesses.
C. F. Brown.
Melville Church.
Inventor.
J. M. Willbur.
Hill & Ellsworth
Attys.

UNITED STATES PATENT OFFICE.

JAMES M. WILLBUR, OF NEW YORK, N. Y.

IMPROVEMENT IN VAULT-COVERS.

Specification forming part of Letters Patent No. 150,119, dated April 21, 1874; application filed December 24, 1873.

CASE A.

*To all whom it may concern:*

Be it known that I, JAMES M. WILLBUR, of the city, county, and State of New York, have invented certain new and useful Improvements in Flagging of Sidewalks; and I do hereby declare the following to be a full and exact description of the same, reference being had to the accompanying drawing forming part of this specification, in which—

Figure 1 is a perspective view of my improved sidewalk. Fig. 2 is a sectional view in the line $y\,y$, Fig. 1.

Similar letters of reference in the accompanying drawings denote the same parts.

My invention consists in the employment, in vault-coverings, vault-lights, or sidewalks, of metallic V or wedged shaped pieces, provided with nuts and screw-threaded bolts, which fit into the interstices between the flag-stones of the vault or sidewalk, and bear upon the rubber or other elastic packing contained therein, and can be tightened by the nuts on the lower ends of the bolts.

In the accompanying drawing, $a\,a$, Fig. 1, represents two of the flag-stones of a vault or sidewalk, between which is the rubber strip $b$, or other similar elastic packing.

In laying the flagging of the vault or sidewalk I prefer to coat the sides of the rubber strip $b$, or other similar elastic packing, with cement, coal-tar, or other analogous adhesive substance, and apply it to the edge of a flag-stone already laid. Many cements may be employed to hold the rubber in place, as, for example, a cement may be made of shellac and ammonia, white lead and water, coal-tar, or a solution of alum and plaster-of-paris, the object of my invention being to retain the rubber in the interstices between the flaggings or the frames of vault-lights by an adhesive material which will retain the rubber in place and secure a water-tight joint. A flag-stone is then laid against the rubber strip, the cement, or other similar adhesive substance, causing the parts to adhere together, while all liability of leakage is prevented, and the expansion and contraction of the flagging from changes of temperature provided for by the elasticity of the packing. To fill up the interstices between the flagging in vaults, I also employ a strip of rubber, $r$, (see Fig. 1,) laid over the interstices and pressed down into it by a wedge or V-shaped piece, $c$, preferably made of metal, and provided with screw-bolts $d\,d$ and nuts $e\,e$, by means of which the V-shaped piece can be tightened. The upper surface of the V-shaped piece $c$ is preferably made flush with the vault-cover or sidewalk, and may be roughened, if desired, to prevent slipping. Cement, coal-tar, or other adhesive substance, is laid on the lower surface of the rubber or other elastic packing before it is applied to the flagging.

Fig. 2 shows a modification of my invention, in which two strips of rubber, $r'\,r'$, coated with cement or other adhesive material are employed in the interstices between the flagging in connection with the V-shaped piece.

I am aware that a fibrous packing coated with paint, between vault-lights and their frames, has heretofore been used, and I therefore lay no claim to such packing, the object of my invention being to retain the packing in place around the lights or between the flagging by means of an adhesive substance, as above described.

I claim as my invention—

The V-shaped piece $c$, provided with screw-threaded bolts $d$, in combination with a rubber strip or other packing inserted between the flag-stones of a sidewalk or the castings of vault-lights, substantially as described, and for the purposes specified.

JAMES M. WILLBUR.

Witnesses:
 MELVILLE CHURCH,
 N. K. ELLSWORTH.